(12) United States Patent
Shimuta

(10) Patent No.: US 11,982,572 B2
(45) Date of Patent: May 14, 2024

(54) STICK-ON THERMOMETER

(71) Applicant: Murata Manufacturing Co., Ltd., Nagaokakyo (JP)

(72) Inventor: Toru Shimuta, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 569 days.

(21) Appl. No.: 17/202,966

(22) Filed: Mar. 16, 2021

(65) Prior Publication Data

US 2021/0208007 A1 Jul. 8, 2021

Related U.S. Application Data

(63) Continuation of application No. PCT/JP2019/044143, filed on Nov. 11, 2019.

(30) Foreign Application Priority Data

Nov. 13, 2018 (JP) .................................. 2018-212764

(51) Int. Cl.
*G01K 1/14* (2021.01)
*G01K 1/02* (2021.01)
(Continued)

(52) U.S. Cl.
CPC ............. *G01K 1/143* (2013.01); *G01K 1/026* (2013.01); *G01K 7/22* (2013.01)

(58) Field of Classification Search
CPC ........... G01K 1/143; G01K 1/026; G01K 7/22
See application file for complete search history.

(56) References Cited

U.S. PATENT DOCUMENTS

2007/0295713 A1 12/2007 Carlton-Foss et al.
2011/0051776 A1 3/2011 Bieberich et al.
(Continued)

FOREIGN PATENT DOCUMENTS

JP 2012073127 A 4/2012
JP 2013503355 A 1/2013
(Continued)

OTHER PUBLICATIONS

Computer translation of JP 2013-20013 downloaded from the Japanese Patent Office website on Oct. 24, 2023.*
(Continued)

*Primary Examiner* — Randy W Gibson
(74) *Attorney, Agent, or Firm* — Arentfox Schiff LLP

(57) ABSTRACT

A stick-on thermometer is provide that includes a first thermal resistor and a second thermal resistor that are arranged substantially parallel to an inner surface of a lower outer body. Moreover, first and second temperature sensors are arranged along a thickness direction of the first thermal resistor, third and fourth temperature sensors are arranged along a thickness direction of the second thermal resistor, and a wiring board is arranged substantially parallel to the first and second thermal resistors and on which there is mounted a processing circuit that processes detection signals of the first to fourth temperature sensors. The first and second thermal resistors are respectively formed of three first thermal resistor layers and three second thermal resistor layers formed substantially parallel to the inner surface of the lower outer body.

20 Claims, 13 Drawing Sheets

(51) Int. Cl.
    *G01K 1/143*    (2021.01)
    *G01K 7/22*     (2006.01)

(56) References Cited

U.S. PATENT DOCUMENTS

| | | | | |
|---|---|---|---|---|
| 2018/0028072 | A1* | 2/2018 | Shi | A61B 5/6833 |
| 2020/0333195 | A1* | 10/2020 | Shimuta | H01H 9/04 |
| 2021/0199514 | A1* | 7/2021 | Shimuta | G01K 1/143 |
| 2021/0208007 | A1* | 7/2021 | Shimuta | G01K 7/22 |
| 2021/0345887 | A1* | 11/2021 | Bean | A61B 5/6833 |

FOREIGN PATENT DOCUMENTS

| | | | |
|---|---|---|---|
| JP | 2013200153 | A | 10/2013 |
| JP | 201813395 | A | 1/2018 |

OTHER PUBLICATIONS

Written Opinion of the International Searching Authority issued for PCT/JP2019/044143, dated Jan. 7, 2020.
International Search Report issued for PCT/JP2019/044143, dated Jan. 7, 2020.

\* cited by examiner

STICK-ON THERMOMETER

CROSS REFERENCE TO RELATED APPLICATIONS

The present application is a continuation of PCT/JP2019/044143 filed Nov. 11, 2019, which claims priority to Japanese Application No. 2018-212764, filed Nov. 13, 2018, the entire contents of each of which are incorporated herein by reference.

TECHNICAL FIELD

The present invention relates to a stick-on thermometer, and, more particularly, to a stick-on thermometer that is stuck to a body surface in order to measure the body temperature.

BACKGROUND

Currently, thermometers are provided to be stuck to a body surface to acquire body temperature data by continuously measuring the body temperature. For example, Patent Document 1 (identified below) discloses a non-heating-type thermometer that is stuck to a body surface of a subject and measures the core body temperature of the subject.

The thermometer described in Patent Document 1 includes first and second thermal resistors with a first temperature sensor being arranged at one surface that is in contact with the body surface and a second temperature sensor being arranged at another surface opposite the one surface. Moreover, the thermometer includes a leveling member that is formed so as to cover only the other surface of the first and second thermal resistors.

In this thermometer, the thickness of the first thermal resistor is 0.5 to 10 mm and the thickness of the second thermal resistor 123 is 1 to 20 mm. In addition to polyacetal, which is a non-foam material, for example, polycarbonate, polypropylene, polyethylene terephthalate, polymethyl methacrylate, and an acrylonitrile-butadiene-styrene copolymer are used as the materials of thermal resistors.

Patent Document 1: Japanese Unexamined Patent Application Publication No. 2012-73127.

In order to accurately measure body temperature, the thermometer must closely contact a body surface. The material used for the thermal resistors disclosed in the above-mentioned Patent Document 1 is often a comparatively rigid material such as resin and such a material is inferior in terms of being able to closely contact a body surface and follow the movement of a body surface. As a result, the accuracy with which the body temperature is measured may be reduced. On the other hand, when an attempt is made to improve the close contact with a body surface and so forth, bending stress acting on the thermal resistors will increase, and for example, the possibility will also increase of the wiring board including the temperature sensors attached to the thermal resistors being damaged.

SUMMARY OF THE INVENTION

The present invention addresses the above-described problems. Thus, it is an object of the present invention to provide a stick-on thermometer, which is to be stuck to the surface of a body in order to measure body temperature, that more closely contacts and follows a body surface and is also constructed to prevent damage to a wiring board and so on inside the stick-on thermometer.

According to an exemplary embodiment, a stick-on thermometer is provided that is to be stuck to a body surface to measure a body temperature. The stick-on thermometer includes a thermal resistor that has a prescribed thermal resistance value and is disposed substantially parallel to an inner surface of a lower outer body of the stick-on thermometer in a cross-sectional view. Moreover, a plurality of temperature detectors are arranged along a thickness direction of the thermal resistor; and a wiring board that is arranged substantially parallel to the thermal resistor and on which a processing circuit is mounted that processes detection signals from the plurality of temperature detectors. The thermal resistor is formed of a plurality of thermal resistor layers formed substantially parallel to the inner surface of the lower outer body.

According to the stick-on thermometer of the exemplary embodiment, the thermal resistor is formed of a plurality of thermal resistor layers formed substantially parallel to the inner surface of the lower outer body of the stick-on thermometer. In other words, the thermal resistor has a multi-layer structure, and therefore even if a material having a comparatively high rigidity is used for the thermal resistor, the thermal resistor can easily deform and thus make close contact to follow a body surface. On the other hand, despite the ability to closely contact and follow a surface being improved, stress acting on the thermal resistor (e.g., thermal resistor layers) can be alleviated, and therefore, for example, a wiring board on attached to the thermal resistor can be prevented from being damaged.

According to the exemplary embodiment, a stick-on thermometer is provide that is to be stuck to a body surface in order to measure body temperature. The stick-on thermometer is constructed to closely contact and follow a body surface and further constructed to prevent a wiring board or the like inside the stick-on thermometer from being damaged.

DETAILED DESCRIPTION OF EMBODIMENTS

Figure 1:
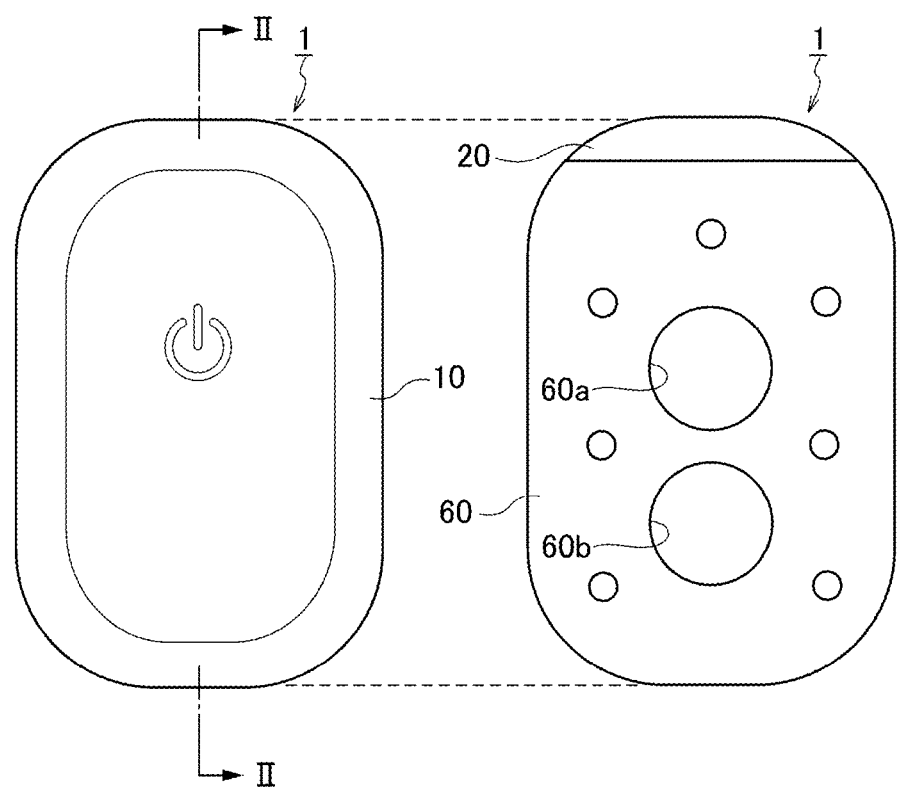
FIG. 1 depicts a plan view and a bottom view illustrating the exterior of a core thermometer according to an exemplary embodiment.

Hereafter, an exemplary embodiment of the present invention will be described while referring to the drawings. In the drawings, the same symbols are used for identical or corresponding parts. In addition, in the drawings, identical elements are denoted using the same symbols and repeated description thereof is omitted.

Figure 2:
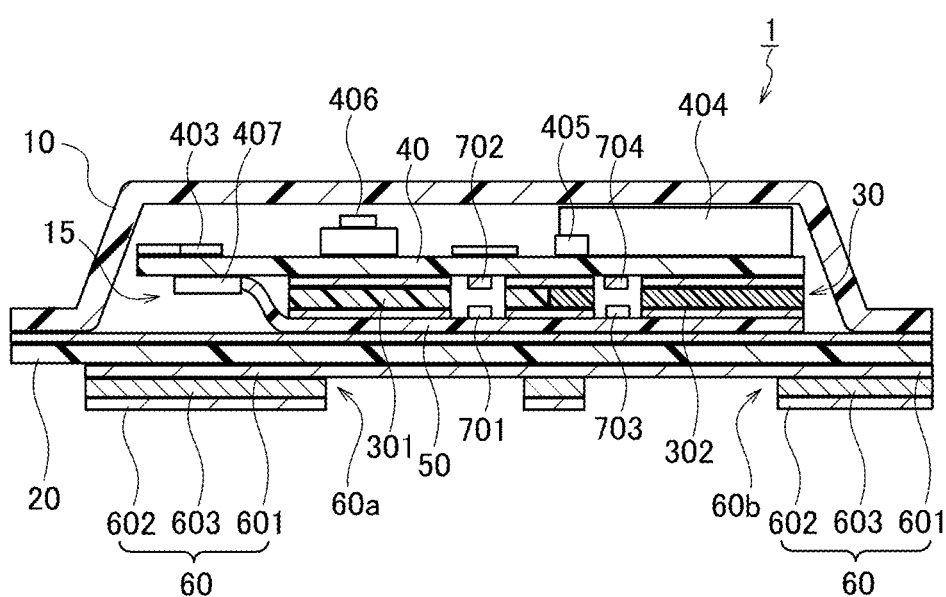
FIG. 2 is a sectional view illustrating the configuration of the core thermometer according to the exemplary embodiment.
Figure 3:
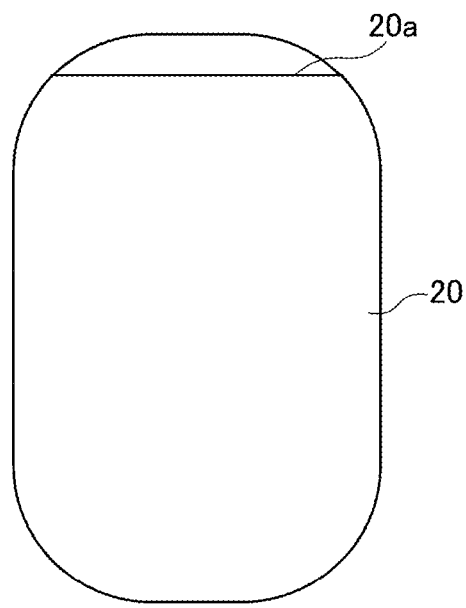
FIG. 3 is a plan view illustrating a lower outer body of the core thermometer according to the exemplary embodiment.
Figure 4:
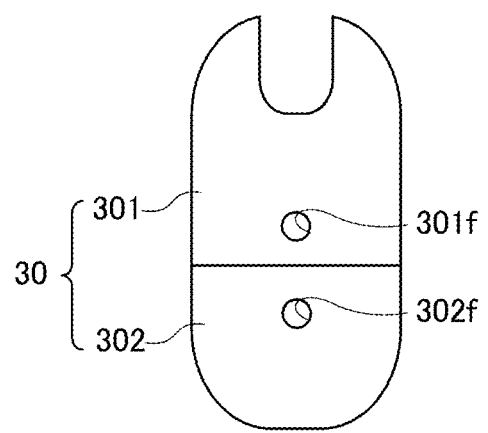
FIG. 4 is a plan view illustrating thermal resistors of the core thermometer according to the exemplary embodiment.
Figure 5:
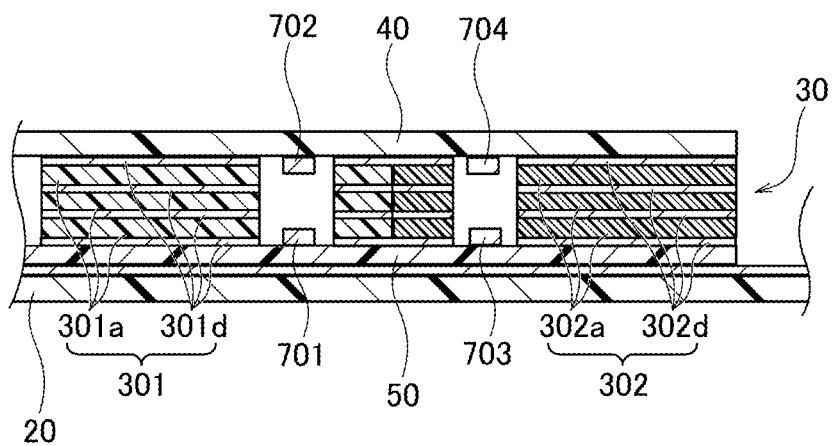
FIG. 5 is a sectional view illustrating the thermal resistors of the core thermometer according to the exemplary embodiment in an enlarged manner.
Figure 6:
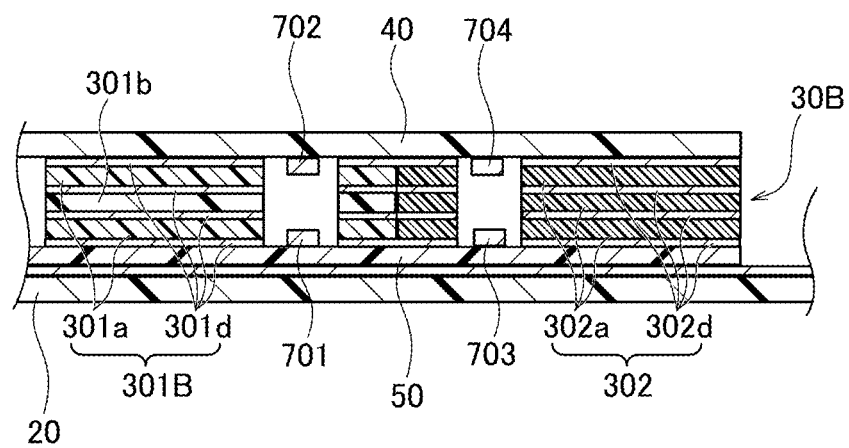
FIG. 6 is a sectional view illustrating thermal resistors according to a first modification of the exemplary embodiment in an enlarged manner.
Figure 7:
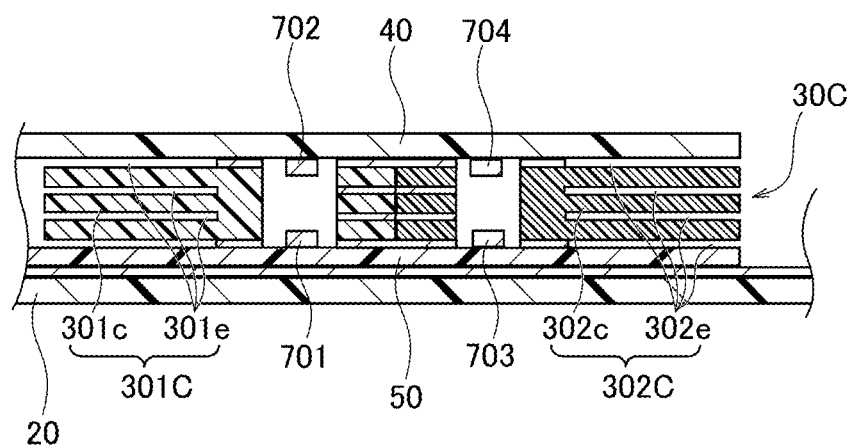
FIG. 7 is a sectional view illustrating thermal resistors according to a second modification of the exemplary embodiment in an enlarged manner.
Figure 8:
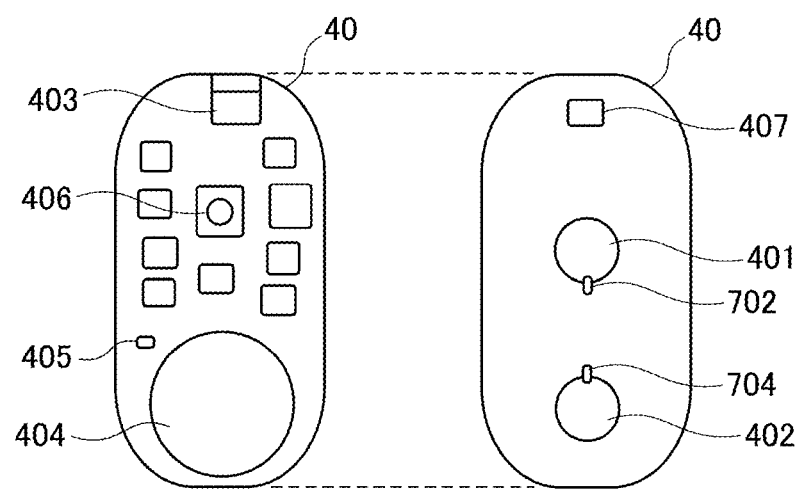
FIG. 8 depicts a plan view and a bottom view illustrating a wiring board of the core thermometer according to the exemplary embodiment.
Figure 9:
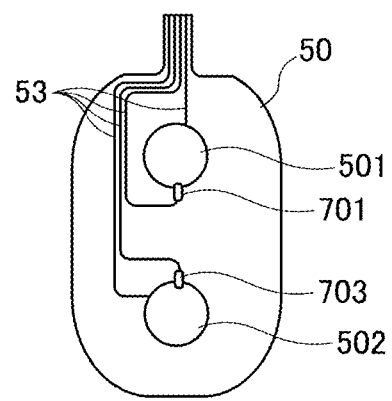
FIG. 9 is a plan view illustrating a flexible substrate of the core thermometer according to the exemplary embodiment.
Figure 10:
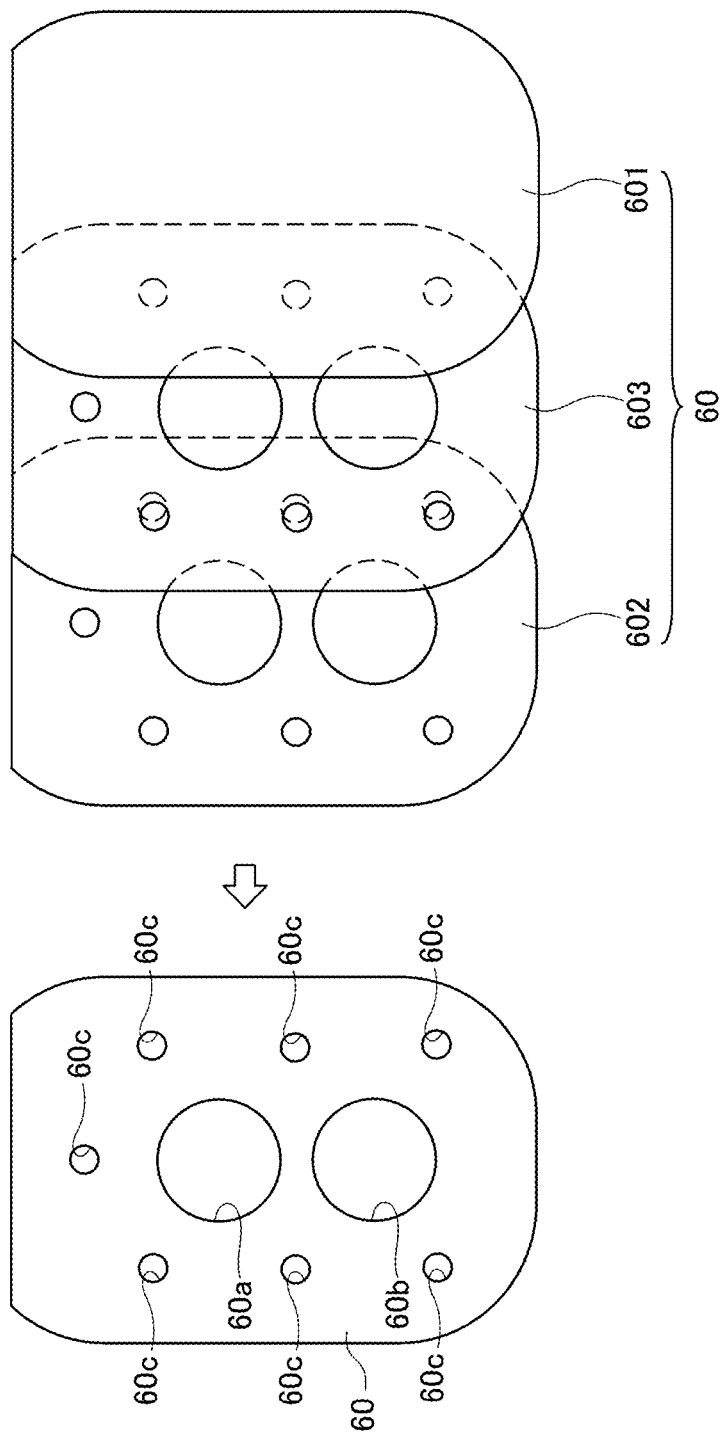
FIG. 10 depicts a plan view and an exploded view illustrating a sticking member of the core thermometer according to the exemplary embodiment.

First, the configuration of a stick-on core thermometer 1 according to an exemplary embodiment will be described using FIGS. 1 to 10. For this disclosure, a case where the present invention is applied to a non-heating-type core thermometer (hereafter, simply "core thermometer") will be described as an example. FIG. 1 depicts a plan view and a bottom view illustrating the exterior of the core thermometer 1. FIG. 2 is a sectional view (sectional view taken along line II-II in FIG. 1) illustrating the configuration of the core thermometer 1. FIG. 3 is a plan view illustrating a lower outer body 20 of the core thermometer 1. FIG. 4 is a plan view illustrating a thermal resistor 30 of the core thermometer 1. FIG. 5 is a sectional view illustrating the thermal resistor 30 of the core thermometer 1. FIG. 6 is a sectional view illustrating a thermal resistor 30B according to a first modification in an enlarged manner. FIG. 7 is a sectional view illustrating a thermal resistor 30C according to a second modification in an enlarged manner. FIG. 8 depicts a plan view and a bottom view illustrating a wiring board 40 of the core thermometer 1. FIG. 9 is a plan view illustrating a flexible substrate 50 of the core thermometer 1. FIG. 10 depicts a plan view and an exploded view illustrating a sticking member 60 of the core thermometer 1.

The core thermometer 1 is a non-heating type thermometer that obtains a core body temperature by determining the flow of heat from a core part of the user (e.g., the subject or patient) on the basis of the difference between temperatures detected by a first temperature sensor 701 and a second temperature sensor 702 and the difference between temperatures detected by a third temperature sensor 703 and a fourth temperature sensor 704. In addition, the core thermometer 1 is a stick-on core thermometer that is constructed to be stuck to a body surface of a user and to obtain body temperature data by continuously measuring the body temperature. In particular, the core thermometer 1 is constructed to more closely contact and follow a body surface and to also prevent the wiring board 40 and the like inside the core thermometer 1 from being damaged.

The core thermometer 1 mainly includes a reusable body including an upper outer body 10, a lower outer body 20, and a body-temperature-measuring unit 15, and a detachable (replaceable) sticking member 60. Furthermore, the body-temperature-measuring unit 15 mainly includes the wiring board 40 on which the thermal resistor 30, the second temperature sensor 702, and the fourth temperature sensor 704 are mounted and the flexible substrate 50 on which the first temperature sensor 701 and the third temperature sensor 703 are mounted. These constituent elements will be described in detail below.

The upper outer body 10 is formed of a waterproof, closed-cell or semi-closed-cell foam material, for example. A foam material having low thermal conductivity is preferably used for the upper outer body 10 in order to prevent local temperature changes from occurring in the body-temperature-measuring unit 15 due to sudden fluctuations (e.g., changes) in the outside air temperature. For example, polyurethane, polystyrene, polyolefin, and so forth are suitably used as the material. Furthermore, for example, vacuum molding is suitably used as a processing method for the upper outer body 10. The upper outer body 10 is formed to substantially have a hat-like shape in cross section so as to be able to accommodate the body-temperature-measuring unit 15 (e.g., thermal resistor 30, wiring board 40, flexible substrate 50, and so on). Therefore, the foam material covers the sides of the thermal resistor 30 and prevents the sides of the thermal resistor 30 from being exposed to the outside air.

The lower outer body 20 is, for example, formed from a non-foam resin film that is waterproof (e.g., has a low moisture permeability) and has a higher thermal conductivity than the upper outer body 10. For example, polypropylene, polyethylene, polyester, polyimide, or the like may be used as the material and polyethylene terephthalate is particularly suitable. The lower outer body 20 is formed with a planar (i.e., flat) shape so that the flexible substrate 50 (body-temperature-measuring unit 15) to which the first temperature sensor 701 and the third temperature sensor 703 are attached can be fixed thereto with close contact therebetween. Since the thermal resistance changes and the thermal flux is affected when there are gaps between the body-temperature-measuring unit 15 and the lower outer body 20, it is preferable that the body-temperature-measuring unit 15 and the lower outer body 20 are fixed to each other with close contact therebetween using double-sided tape or an adhesive. The sizes (e.g., outer dimensions) of the upper outer body 10 and the lower outer body 20 are formed so as be identical or substantially identical, for example, around 40 to 100 mm in length and around 20 to 60 mm in width.

A peripheral portion of the upper outer body 10, which is formed in a substantially hat-like shape in cross section, and a peripheral portion of the lower outer body 20, which is formed in a planar shape, are fixed to each other with close contact therebetween by, for example, being stuck together with double-sided tape, fixed together with an adhesive, or heat sealed. Preferably, the part where the upper outer body 10 and the lower outer body 20 are fixed together with close contact therebetween have a structure that is flat and wrinkle resistant in order to realize waterproof performance. In other words, it is preferable that the outer peripheral portion of the lower outer body 20 be flat, that the opposite outer peripheral portion of the upper outer body 10 be flat, and that the outer peripheral portions of the lower outer body 20 and the lower outer body 20 be stuck together so as to be fixed to each other with close contact therebetween. With this configuration, a force is applied uniformly at the closely contacting fixed parts. As a result, the configuration is such that a problem in which the waterproof performance is adversely affected such as wrinkles being formed is unlikely to occur.

As illustrated in FIG. 2, the body-temperature-measuring unit 15 is formed by stacking the flexible substrate 50, the thermal resistor 30, and the wiring board 40 on top of one another in this order from the side near the lower outer body 20.

The thermal resistor 30 includes two thermal resistors having different thermal resistance values, namely, a first thermal resistor 301 and a second thermal resistor 302 in order to form two thermal fluxes. A material having higher thermal conductivity (i.e., a lower thermal resistance value) than the second thermal resistor 302 such as various plastics such as polypropylene, polyethylene, acrylic, polycarbonate, or epoxy resin is suitably used for the first thermal resistor 301. A material having lower thermal conductivity (i.e., a higher thermal resistance value) than the first thermal resistor 301 such as such as a foam plastic (e.g., foam material) such as polyurethane, polystyrene, or polyolefin is suitably used for the second thermal resistor 302. However, plastics and rubbers that are not in the form of a foam can also be used. It is preferable that the material of the second thermal resistor 302 have a smaller Young's modulus than the material of the first thermal resistor 301. The thermal conductivity of a metal such as copper or aluminum is 100 [W/m/K] or higher, whereas the thermal conductivity of plastics such as polypropylene, polyethylene, acrylic, polycarbonate, and epoxy resin is around 0.1 to 0.5 [W/m/K], which is around three orders of magnitude smaller. The thermal conductivity of foam plastics is yet another order of magnitude smaller. The thermal conductivity of air is even smaller at 0.024 [W/m/K]. The first thermal resistor 301 and the second thermal resistor 302 are preferably formed so as to have substantially the same thickness so as to be able to be stacked together with the wiring board 40 and the flexible substrate 50, which leads to a reduction in cost. It is noted that the term "substantially" takes into account minor variations in thickness that may result from manufacturing differences. Moreover, the total thickness of the first thermal resistor 301 and the second thermal resistor 302 is, for example, preferably 10 mm or less and more preferably 5 mm or less. This is because as the total thickness increases, the ability to follow a surface deteriorates and discomfort to the user during application becomes greater.

The first thermal resistor 301 is formed of a plurality of (e.g., three layers in this embodiment) sheet-shaped first thermal resistor layers 301a formed substantially parallel to an inner surface of the lower outer body 20 in a sectional view. Similarly, the second thermal resistor 302 is formed of a plurality of (e.g., three layers in this embodiment) sheet-shaped second thermal resistor layers 302a formed substantially parallel to an inner surface of the lower outer body 20 in a sectional view. It is noted that the number of layers of the first thermal resistor layers 301a and the second thermal resistor layers 302a is not limited to three and may instead be two. Furthermore, there may be four or more such layers. In addition, the number of first thermal resistor layers 301a and the number of second thermal resistor layers 302a are preferably the same as each other but may be different. Furthermore, one thermal resistor out of the first thermal resistor 301 and the second thermal resistor 302 may have a multilayer structure consisting of two or more layers and the other thermal resistor may have a single-layer structure.

According to an exemplary aspect, it is preferable that the thicknesses of the first thermal resistor layers 301a of the first thermal resistor 301 and the second thermal resistor layers 302a of the second thermal resistor 302 be formed so as to be substantially identical to each other. The thermal resistor 30 in which there is little positional misalignment between the first thermal resistor 301 and the second thermal resistor 302 can be relatively easily formed by making the thicknesses of the first thermal resistor layers 301a and the second thermal resistor layers 302a substantially equal to each other and stacking the first thermal resistor layers 301a and the second thermal resistor layers 302a so as to form an integrated body. However, the thickness of the first thermal resistor layers 301a and the thickness of the second thermal resistor layers 302a do not necessarily have to be the same, and may instead be different from each other. The thickness of one layer of the first thermal resistor layers 301a and the second thermal resistor layers 302a is, for example, preferably 0.05 to 4.0 mm and more preferably 0.4 to 2.0 mm It is also preferable that the thickness of the first thermal resistor 301 and the thickness of the second thermal resistor 302 be formed so as to be substantially identical. The thicknesses of the first thermal resistor 301 and the second thermal resistor 302 can be made substantially identical by stacking identical numbers of sheets of the first thermal resistor layers 301a and sheets of the second thermal resistor layers 302a having substantially identical thicknesses. Making the thicknesses of the first thermal resistor 301 and the second thermal resistor 302 substantially identical enables the wiring board 40 to be stacked in close contact on the first thermal resistor 301 and the second thermal resistor 302 (i.e., the thermal resistor 30) and enables a reduction in size to be realized. However, the thickness of the first thermal resistor 301 and the thickness of the second thermal resistor 302 do not necessarily have to be the same, and may instead be different from each other.

A plurality (e.g., three) of first thermal resistor layers 301a forming the first thermal resistor 301 are stuck together using double-sided tapes 301d. Similarly, a plurality (e.g., three) of second thermal resistor layers 302a forming the second thermal resistor 302 are stuck together using double-sided tapes 302d. Here, if voids having high thermal resistance are generated between the layers, the thermal resistance value will not be stable. However, a multilayer thermal resistor without any voids can be easily formed by sticking the layers together using the double-sided tapes 301d and 302d. For the double-sided tapes 301d and 302d, acrylic, epoxy, or silicon resin is preferably used as the sticking agent. In addition, the thermal conductivity of the double-sided tapes 301d and 302d is preferably similar to that of the first thermal resistor 301 and is preferably higher than that of the second thermal resistor 302. However, the layers may be stuck to each other using an adhesive or a sticking agent instead of the double-sided tapes 301d and 302d.

According to the exemplary aspect, the Young's modulus of the double-sided tapes 301d and 302d is preferably smaller than the Young's modulus of at least one out of the first thermal resistor layers 301a and the second thermal resistor layers 302a. When the double-sided tapes 301d and 302d having a smaller Young's modulus than the first thermal resistor layers 301a and/or second thermal resistor layers 302a are used, the rigidities of the first thermal resistor 301 and the second thermal resistor 302 (e.g., multilayer thermal resistor) fall and the first thermal resistor 301 and the second thermal resistor 302 are better able to closely contact and follow a body surface. The Young's modulus can be made smaller than that of the material of the first thermal resistor 301 described above by using acrylic, epoxy, or silicon resin as the sticking agent for the double-sided tapes 301d and 302d, for example.

The Young's modulus of polyethylene (e.g., high density), which is a relatively soft resin among the materials that can be used to form the first thermal resistor layers 301a and the second thermal resistor layers 302a, is around 400 to 1200 MPa. The Young's modulus of the double-sided tapes 301d and 302d is preferably lower than the Young's modulus of polyethylene (e.g., high density). In addition, it is also preferable to use the sticking agent alone, i.e., to use baseless double-sided tapes. However, even in the case where a double-sided tape having a base material is used, the Young's modulus of PET (for example, around 2800 to 4100 MPa), for example, is greater than the Young's modulus of polyethylene as described above, but the sticking agent layer can be made thicker than the PET layer so that the surface-following ability is not impaired. Furthermore, it is also desirable to use a base material comprising a non-woven fabric. Furthermore, if an adhesive is used, the Young's modulus of the adhesive after curing is preferably lower than the Young's modulus of polyethylene (e.g., high density).

The thicknesses of the double-sided tapes 301d and 302d are preferably formed so as to be smaller than the thicknesses of the first thermal resistor layers 301a and the second thermal resistor layers 302a. The thicknesses of the double-sided tapes 301d and 302d are preferably less than or equal to ½ and more preferably less than or equal to ⅕ the thicknesses of the first thermal resistor layers 301a and the second thermal resistor layers 302a in order to reduce the effect of the double-sided tapes 301d and 302d on the thermal resistance values. More specifically, the thicknesses of the double-sided tapes are, for example, preferably 0.01 to 0.4 mm and more preferably 0.05 to 0.2 mm.

The double-sided tapes 301d and 302d allow relative misalignment between the layers of the plurality (e.g., three layers) of first thermal resistor layers 301a and second thermal resistor layers 302a. The thermal conductivity of the double-sided tapes 301d and 302d is preferably greater than or equal to the thermal conductivity of the material forming the first thermal resistor layers 301a and the second thermal resistor layers 302a. If the thermal conductivity of the double-sided tapes 301d and 302d is smaller than the thermal conductivity of the first thermal resistor layers 301a and the second thermal resistor layers 302a, the thermal resistance values of the first thermal resistor 301 and the second thermal resistor 302 will undesirably significantly change, but the first thermal resistor 301 and the second thermal resistor 302 can be formed without greatly affecting the thermal resistance values of the first thermal resistor 301 and the second thermal resistor 302 by using double-sided tapes 301d and 302d having a thermal conductivity substantially identical to or larger than that of the first thermal resistor layers 301a and the second thermal resistor layers 302a.

As described above, the total thickness of the first thermal resistor layers 301a and the double-sided tapes 301d (i.e., the first thermal resistor 301) and the total thickness of the second thermal resistor layers 302a and the double-sided tape 302d (i.e., the second thermal resistor 302) are, for example, preferably less than or equal to 10 mm and more preferably less than or equal to 5 mm. This is because as the total thickness increases, the ability to follow a surface deteriorates and discomfort to the user during application becomes greater as well. The number of stacked layers forming the first thermal resistor layers 301a and the double-sided tapes 301d and the number of stacked layers forming the second thermal resistor layers 302a and the double-sided tapes 302d are, for example, preferably less than or equal to 11 layers and more preferably 2 to 5 layers. This is because, for example, if the total thickness of the first thermal resistor 301 and the second thermal resistor 302 is 5 mm, the thickness of one layer of the first thermal resistor layers 301a and the second thermal resistor layers 302a is 0.4 mm, and the thickness of the double-sided tapes 301d and 302d is 0.05 mm, 5/(0.4+0.05)=11.1.

Example 1

Next, as Example 1, an example of a preferred combination of the first thermal resistor layers 301a, the second thermal resistor layers 302a, the double-sided tapes 301d, and the double-sided tapes 302d will be described. The configuration of this Example 1 is as follows:
- Number of stacked layers of first thermal resistor layers 301a and second thermal resistor layers 302a: 2
- Material of first thermal resistor layers 301a: polypropylene (Young's modulus around 1100 to 1550 MPa)
- Material of second thermal resistor layers 302a: polyethylene foam material (Young's modulus less than 1000)
- Thickness per layer of first thermal resistor layers 301a and second thermal resistor layers 302a: 0.5 to 0.6 mm
- Material of double-sided tapes 301d and 302d: acrylic sticking agent (PET base material)
- Thickness of double-sided tapes 301d and 302d: 0.01 mm Example 2

Similarly, as Example 2, an example of another preferred combination of the first thermal resistor layers 301a, the second thermal resistor layers 302a, the double-sided tapes 301d, and the double-sided tapes 302d will be described. The configuration of this Example 2 is as follows:
- Number of stacked layers of first thermal resistor layers 301a and second thermal resistor layers 302a: 3
- Material of first thermal resistor layers 301a: polypropylene (Young's modulus around 1100 to 1550 MPa)
- Material of second thermal resistor layers 302a: polyethylene foam material (Young's modulus less than 1000)
- Thickness per layer of first thermal resistor layers 301a and second thermal resistor layers 302a: 0.5 to 0.6 mm
- Material of double-sided tapes 301d and 302d: acrylic sticking agent (baseless)
- Thickness of double-sided tapes 301d and 302d: 0.05 mm (First Modification)

In the above-described embodiment, a configuration is described in which first and second thermal resistor layers 301a and 302a composed of the same material are stacked, but it is noted that first and second thermal resistor layers 301a and 302a composed of materials having different thermal conductivities may instead be stacked. For example, the thermal conductivities (e.g., thermal resistance values) of the first thermal resistor layers 301a forming the first thermal resistor 301 do not necessarily have to be identical (refer to first thermal resistor layer 301b in FIG. 6). Similarly, the thermal conductivities (e.g., thermal resistance values) of the second thermal resistor layers 302a forming the second thermal resistor 302 do not necessarily have to be identical. In other words, the first thermal resistor 301 and/or the second thermal resistor 302 may each include thermal resistor layers having different thermal conductivities from each other. The thermal resistance values can be adjusted by stacking first and second thermal resistor layers 301a and 302a formed from a plurality of materials having different thermal conductivities and the ratio between the thermal resistance values of the first thermal resistor 301 and the second thermal resistor 302 can be adjusted to a value suitable for taking measurements.

(Second Modification)

In addition, in the above-described embodiment, the first and second thermal resistors 301 and 302 are formed in the shape of layers, but the first and second thermal resistors 301 and 302 may be configured such that slits are formed in outer peripheral portions thereof (i.e., notches are provided) except for around temperature sensors 70 looking in the thickness direction of the first and second thermal resistors 301 and 302. As illustrated in FIG. 7, slits 301e and 302e are preferably formed substantially parallel to the inner surface of the lower outer body 20. However, the slits 301e and 302e may instead be formed perpendicular to the inner surface of the lower outer body 20. In the case where the slits 301e and 302e are formed perpendicular to the inner surface of the lower outer body 20, it is preferable that, for example, the slits 301e and 302e be formed in a radiating manner or in concentric circular shapes around the temperature sensors 70. In addition, the first and second thermal resistors 301 and 302 are not necessarily separated by the slits 301e and 302e and may instead contact each other across the slits 301e and 302e.

A first through hole 301f that penetrates in the thickness direction is formed in the first thermal resistor 301 of the thermal resistor 30 (e.g., as shown in FIG. 4). Similarly, a second through hole 302f that penetrates in the thickness direction is formed in the second thermal resistor 302 of the thermal resistor 30. In a plan view, the first through hole 301f is formed such that the first temperature sensor 701 and the second temperature sensor 702 are positioned inside the first through hole 301f. In other words, the pair of the first temperature sensor 701 and the second temperature sensor 702 are arranged in the thickness direction of the first thermal resistor 301 inside (i.e., on the inner side) of the first through hole 301f. Similarly, in a plan view, the second through hole 302f is formed such that the third temperature sensor 703 and the fourth temperature sensor 704 are positioned inside the second through hole 302f. In other words, the pair of the third temperature sensor 703 and the fourth temperature sensor 704 are arranged in the thickness direction of the second thermal resistor 302 inside (on the inner side) of the second through hole 302f.

Here, as the first to fourth temperature sensors 701 to 704 (hereinafter, may be collectively referred to as "temperature sensors 70"), for example, a thermistor or temperature measuring resistor whose resistance value varies with temperature is suitably used. The temperature sensors 70 preferably have as small a thermal capacity as possible from the viewpoint of improving responsiveness. Therefore, for example, a chip thermistor is suitably used as the temperature sensors 70. The first to fourth temperature sensors 701 to 704 are electrically connected to a processing circuit (MCU), which is described later, via printed wiring and electrical signals (e.g., voltage values) corresponding to temperatures are read by the processing circuit (MCU).

Although it is important to make the thermal resistor 30 (first thermal resistor 301 and second thermal resistor 302) small in order to make the size of the heat-flow-type core thermometer 1 small, temperature measurement errors may increase when the thermal resistor 30 is made small due to the difference between the output values of a pair of temperature sensors 70 becoming small. Here, since the temperature sensors 70 (e.g., chip thermistors) have a substantially rectangular parallelepiped shape and are thick, the thickness of the temperature sensors 70 cannot be ignored when the thermal resistor 30 is thin. When the temperature sensors 70 touch a side surface of the thermal resistor 30, heat is transmitted from the place of contact, and therefore the temperature (detected value) of the temperature sensors 70 may become a temperature (value) that is shifted from the surface temperature of the thermal resistor 30. Accordingly, and in order to reduce this effect, a structure is provided in which the through holes 301f and 302f are formed in the thermal resistor 30 (i.e., first thermal resistor 301 and second thermal resistor 302) so as to surround the temperature sensors 70 and the temperature sensors 70 do not touch the side surfaces of the thermal resistor 30 (i.e., first thermal resistor 301 and second thermal resistor 302).

In an exemplary aspect, the wiring board 40 is, for example, a rigid substrate such as a glass epoxy substrate. However, the wiring board 40 may be a flexible substrate (FPC). A processing circuit that acquires core body temperature data by processing output signals from the first to fourth temperature sensors 701 to 704 is mounted on the wiring board 40. Furthermore, a wireless communication unit 403 that transmits (outputs) the acquired core body temperature data and a coin cell 404 that supplies power to the processing circuit and the wireless communication unit 403 are mounted on the wiring board 40. The processing circuit mainly includes a temperature input circuit and an arithmetic processing circuit. The temperature input circuit includes, for example, an amplifier (for example, an operational amplifier) and an analog-to-digital converter (A/D converter) in order to read the detection signals (e.g., output voltages) of the temperature sensors 70. The temperature input circuit amplifies an analog signal output from each temperature sensor 70, converts the amplified analog signal into a digital signal, and outputs the digital signal to the arithmetic processing circuit.

The arithmetic processing circuit calculates a core body temperature from measurement (e.g., temperature) data read there into. The arithmetic processing circuit is, for example, formed of a micro control unit (MCU), an EEPROM, a RAM, and so on and calculates the core body temperature on the basis of detected values of each temperature sensor 70 read in via the temperature input circuit. Furthermore, the arithmetic processing circuit stores the calculated core body temperature data in a memory such as a RAM. In addition, the arithmetic processing circuit outputs the calculated core body temperature data to the wireless communication unit 403 and the calculated core body temperature data is wirelessly output (e.g., transmitted) to an external device.

Here, the arithmetic processing circuit is configured to calculate (e.g., estimate) the core body temperature on the basis of the temperature difference between the front and rear surfaces of the first and second thermal resistors 301 and 302 generated due to the difference between the two thermal fluxes formed using the first and second thermal resistors 301 and 302 having two different thermal resistances. More specifically, the arithmetic processing circuit calculates a core body temperature Tb on the basis of the following Formula (1), for example as provided as follows:

$$Tb = \{T1(T3-T4)*Ra1 - T3(T1-T2)*Ra2\} / \{(T3-T4)*Ra1 - (T1-T2)*Ra2\} \quad (1)$$

Here, Tb represents the core body temperature, T1 represents the temperature detected by the first temperature sensor 701, T2 represents the temperature detected by the second temperature sensor 702, and Ra1 represents the thermal resistance value of the first thermal resistor 301. Furthermore, T3 represents the temperature detected by the third temperature sensor 703, T4 represents the temperature detected by the fourth temperature sensor 704, and Ra2 represents the thermal resistance value of the second thermal resistor 302.

Here, since Ra1 and Ra2 are already known, the core body temperature Tb can be uniquely obtained by detecting the four temperatures (i.e., T1, T2, T3, and T4).

The second temperature sensor 702, which detects the temperature of the upper surface (outside air side) of the first thermal resistor 301, and the fourth temperature sensor 704, which detects the temperature of the upper surface (outside air side) of the second thermal resistor 302, are mounted on the lower surface of the wiring board 40. In more detail, a pair of thermal equalization patterns 401 and 402, which are for equalizing the temperature distribution in the surrounding area, are formed on the lower surface of the wiring board 40. One electrode of the second temperature sensor 702 is connected to the thermal equalization pattern 401, and one electrode of the fourth temperature sensor 704 is connected to the thermal equalization pattern 402. The thermal equalization patterns 401 and 402 are, for example, formed of a material having a high thermal conductivity such as metal films.

In order to prevent only the temperature of part of the wiring board 40 from changing due to the effect of the outside air temperature and so forth, it is preferable to provide a high-thermal-conductivity equalization member, which is for thermally equalizing the effect of the temperature distribution of the outside air temperature, on the rear side (outside air side) of the wiring layer where the second temperature sensor 702 and the fourth temperature sensor 704 are mounted. Here, in an exemplary aspect, a metal foil or thin metal sheet may be used as the equalization member, but the equalization member is preferably formed as a wiring pattern (solid pattern) of an inner layer of the wiring board 40 (multilayer rigid substrate), similarly to the wiring layers formed in the wiring board 40. In this case, a wiring pattern (solid pattern) of an inner layer used as an equalization member may be a ground pattern, but is preferably a separate pattern that is not connected to an electrical circuit and through which a current does not flow.

The wireless communication unit 403 transmits acquired core body temperature data to an external management device or information terminal (for example, a smartphone). Here, the wireless communication unit 403 transmits the core body temperature data to an external management device or information terminal via, for example, a wireless method such as Bluetooth (Registered Trademark). The thin coin cell (battery) 404 supplies power to the above-mentioned processing circuit, wireless communication unit 403, and so forth. In order to reduce the planar area (sticking area) of the body-temperature-measuring unit 15 (core thermometer 1) and in order to prevent the effects of changes in the outside air temperature and heat generated by operation of the wireless communication unit 403, the wireless communication unit 403 and the coin cell 404 are arranged on the opposite side (e.g., a top side) of the wiring board 40 from the temperature sensors 70.

A power supply switch 406, which accepts power supply on/off operations via the upper outer body 10, is mounted on the upper surface of the wiring board 40. Furthermore, an LED 405, which lights up or blinks in accordance with operations performed by the user or the body temperature measurement state (for example, on/off of the power supply switch 406, measurement start/finish, and so on), is mounted on the upper surface of the wiring board 40. For example, a VCSEL or the like may be used instead of an LED. Furthermore, an FPC connector 407, which is for electrically connecting the flexible substrate 50, is attached to the lower surface of the wiring board 40.

According to an exemplary aspect, the flexible substrate (FPC) 50 is formed of, for example, polyimide or polyester and is flexible. The first temperature sensor 701, which detects the temperature of the skin side of the first thermal resistor 301, and the third temperature sensor 703, which detects the temperature of the skin side of the second thermal resistor 302, are mounted on the flexible substrate 50. In more detail, as illustrated in FIG. 6, a pair of thermal equalization patterns 501 and 502, which are for equalizing the temperature distribution in the surrounding area, are formed on the flexible substrate 50, and one terminal of the first temperature sensor 701 is connected to the thermal equalization pattern 501 and one terminal of the third temperature sensor 703 is connected to the thermal equalization pattern 502. The thermal equalization patterns 501 and 502 are, for example, formed of a material having a high thermal conductivity such as metal films. The first temperature sensor 701 and the third temperature sensor 703 are connected to the wiring board 40 (processing circuit) via a wiring pattern 53 and the FPC connector 407 and electrical signals (voltage values) corresponding to the temperatures are read by a processing circuit (temperature input circuit). As described above, the lower outer body 20, the flexible substrate 50, the thermal resistor 30, and the wiring board 40 are fixed in close contact to each other with double-sided tape or the like so that there are no gaps therebetween in order to form thermal flux. In the case where the wiring board 40 is a flexible substrate (FPC), the wiring board 40 may be configured as a single flexible substrate with FPC wiring connected between the individual wiring boards and the flexible substrate may be bent by 180 degrees.

Moreover, the sticking member 60 is formed in a sheet-like shape and has a pair of adhesive sticking surfaces. One of the pair of sticking surfaces is stuck to the outer surface (lower surface) of the lower outer body 20 in so as to be able to be peeled therefrom. In more detail, as illustrated in FIG. 7, the sticking member 60 includes a first sticking layer 601 having one sticking surface that is stuck to the outer surface of the lower outer body 20, a breathable layer 603 that is permeable to air and has one surface that is stuck to the other sticking surface of the first sticking layer 601, and a second sticking layer 602 having one sticking surface that is stuck to the other surface of the breathable layer 603. In other words, the sticking member 60 is formed of the first sticking layer 601, the breathable layer 603, and the second sticking layer 602 stacked in this order from the side near the lower outer body 20.

When the core thermometer 1 stuck to skin in order to use the core thermometer 1, if sweat remains between the skin and the core thermometer 1 (e.g., the lower outer body 20) for a long period of time, the skin may become inflamed, but by providing the sticking member 60 with the breathable layer (e.g., a moisture permeable layer) 603 that allows moisture to pass therethrough, dampness resulting from sweat and so on is suppressed. For example, a non-woven fabric can be suitably used for the breathable layer 603. By using a non-woven fabric as the breathable layer 603, the core thermometer 1 can be stuck in close contact to the skin so as to follow irregularities of the skin (body surface). Furthermore, the comfort with which the core thermometer 1 may be attached can be improved. However, a woven or knitted fabric may be used instead of a non-woven fabric. Paper, wood, sponge/continuous bubble foam materials may be used or plastic, rubber, or metal structures having grooves or holes extending from the center to the periphery thereof may be used.

Since the breathable layer 603 contains air thereinside, the thermal conductivity thereof is usually low. Therefore, if the breathable layer 603 is located between the skin and the device, the accuracy with which the body temperature is measured is affected. Accordingly, in order that the core body temperature is stably measured, the breathable layer 603 is preferably not arranged in the region where the first temperature sensor 701 and the third temperature sensor 703, which measure the temperature of the skin, and the thermal equalization patterns 501 and 502 that are connected to the temperature sensors are stacked.

Here, a case in which a non-woven fabric is used as the breathable layer 603 will be described as an example. As illustrated in FIG. 10, biocompatible double-sided tapes (e.g., first sticking layer 601 and second sticking layer 602) are stuck to both sides of the non-woven fabric (breathable layer 603). The through holes 60a and 60b are formed in the thickness direction in the breathable layer 603 and the second sticking layer 602 so that the first temperature sensor 701 and the third temperature sensor 703 are positioned thereinside in a plan view. It is preferable that the through holes be not formed in the double-sided tape (e.g., first sticking layer 601) stuck to the lower outer body 20. This is because if the through holes were formed (i.e., if there were no first sticking layer 601), there would be a risk that the lower outer body 20 will not closely contact the skin and the measurement accuracy will fall.

Furthermore, since double-sided tape (e.g., second sticking layer 602) usually has worse moisture permeability than non-woven fabric (e.g., breathable layer 603), it is preferable that a plurality of (seven in the example in FIG. 10) through holes 60c, which are formed in the thickness direction, be formed in at least the second sticking layer 602. In this case, for example, it is preferable that through holes 60c with a diameter of 1 to 10 mm be arranged at an interval of around 2 to 20 mm. For example, cut out parts having intersecting parts (cut outs that intersect in a cross shape) may be formed instead of the through holes 60c. In this case, it is preferable to have intersecting cut out parts having a length of around 1 to 10 mm arranged at an interval of around 2 to 20 mm.

Figure 11:
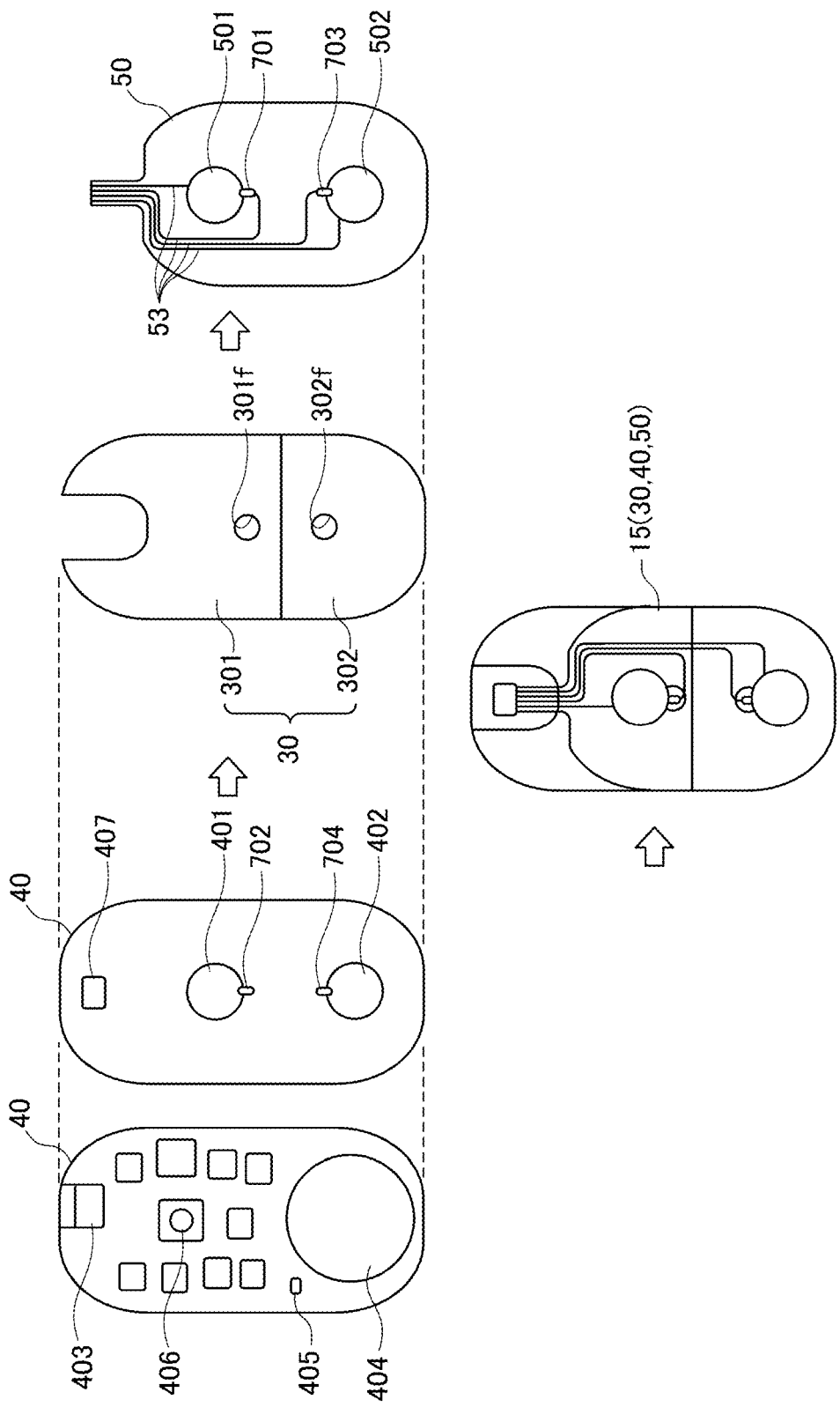
FIG. 11 is a (first) diagram for describing a method of assembling the core thermometer according to the exemplary embodiment.
Figure 12:
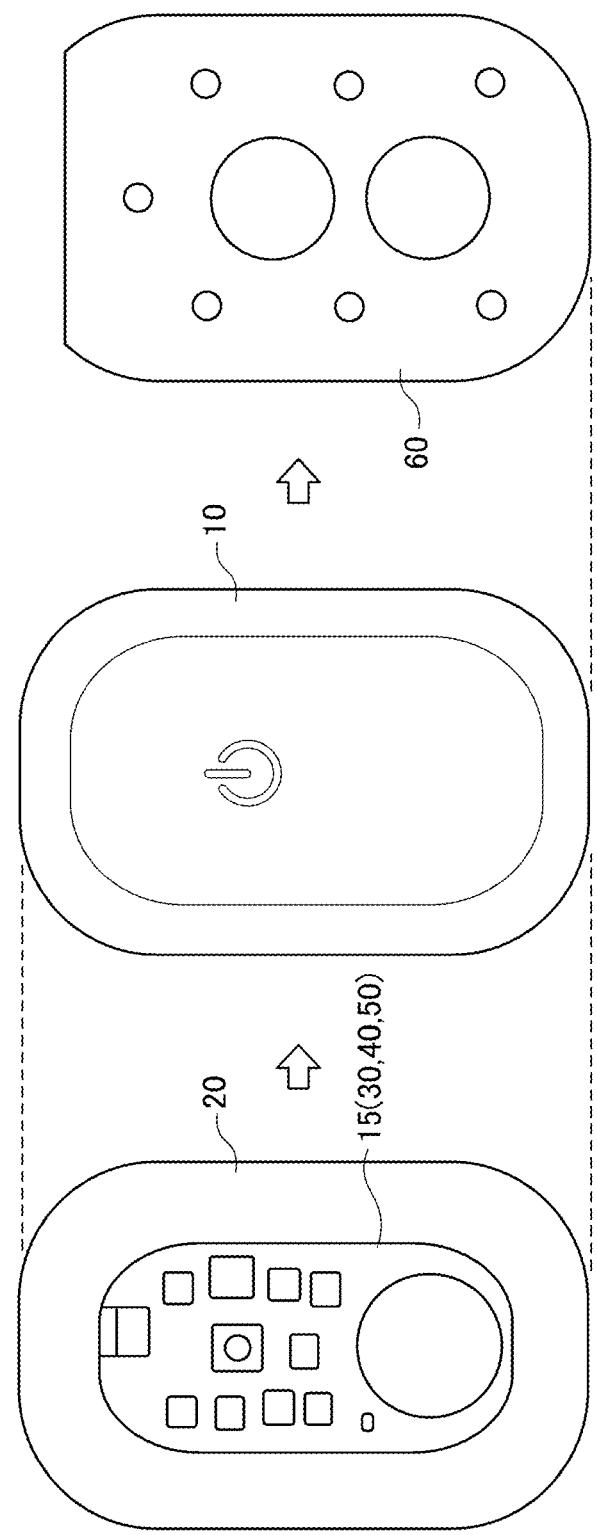
FIG. 12 is a (second) diagram for describing the method of assembling the core thermometer according to the exemplary embodiment.

Next, a method of assembling (method of manufacturing) the core thermometer 1 will be described while referring to FIGS. 11 and 12. FIG. 11 is a (first) diagram for describing a method of assembling the core thermometer 1. FIG. 12 is a (second) diagram for describing a method of assembling the core thermometer 1.

The core thermometer 1 is, for example, assembled using the following steps (1) to (6).

Sheets of the first thermal resistor layers 301a and sheets of the second thermal resistor layers 302a having substantially the same thickness are arranged next to each other, are fixed to each other using the double-sided tapes 301d and 302d, and processed into prescribed shapes. Then, a plurality of similar parts are formed and stacked on top of one another to form the thermal resistor 30 (i.e., first thermal resistor 301 and second thermal resistor 302). After that, one surface of the thermal resistor 30 (i.e., first thermal resistor 301 and second thermal resistor 302) is closely fixed to the rear surface of the wiring board 40 using the double-sided tapes 301d and 302d.

The flexible substrate 50 is connected to the FPC connector 407 of the wiring board 40, and after that, is fixed in close contact to the other surface of the thermal resistor 30 (i.e., first thermal resistor 301 and second thermal resistor 302) using the double-sided tapes 301d and 302d.

The coin cell 404 is attached to the wiring board 40 (for example, is inserted into cell holder mounted on wiring board 40).

The side of the body-temperature-measuring unit 15 (wiring board 40, thermal resistor 30, and flexible substrate 50) near the flexible substrate 50 is fixed in close contact to a center part of the lower outer body 20 with double-sided tape.

The peripheral portion of the upper outer body 10 and the peripheral portion of the lower outer body 20 are fixed in close contact to each other using double-sided tape.

A protective film stuck to the first sticking layer 601 is peeled off, and the sticking member 60 is stuck to the lower outer body 20 (e.g., a bottom surface). In this embodiment, since the first temperature sensor 701 and the third temperature sensor 703 are not arranged at symmetrical positions from the center of the lower outer body 20, a mark 20a for indicating the adhering direction of the sticking member 60 is provided on the lower outer body 20 Therefore, when sticking the sticking member 60 to the lower outer body 20, it is possible to prevent making a mistake in the adhering direction by ensuring that the mark 20a and a cut out part 60d of the sticking member 60 are aligned. However, the first temperature sensor 701 and the third temperature sensor 703 may instead be arranged at symmetrical positions from the center of the lower outer body 20 and the mark 20a indicating the adhering direction of the sticking member 60 may be omitted. The core thermometer 1 is assembled (manufactured) in the manner described above.

When using the thus-assembled core thermometer 1 (i.e., when measuring the core body temperature), first, you pinch a knob (e.g., a tab) using your fingers and then peel a release film adhered to the second sticking layer 602 (e.g., a double-sided tape) of the sticking member 60 away from the second sticking layer 602. Then, after pressing the power supply switch 406 in order to turn the power on, the core thermometer 1 is stuck to the body surface (e.g., a measurement or detection site) of the user (subject or patient). Since it is possible to accidentally press the power supply switch 406 during measurements, it is preferable that operations of turning the power supply on and off performed by, for example, pressing the switch for a few seconds or longer or pressing the switch multiple times be accepted. When an operation is accepted, the LED 405 emits light in a prescribed light pattern to inform the user that the operation has been accepted. When the power is turned on, core body temperature measurement, saving of measurement data to the memory, and wireless output of data are initiated. The preferred measurement sites are the chest, armpit, back, waist, neck, the back of the head, and the forehead when measuring the core body temperature, and the abdomen, side of the torso, thighs, ankles, arms, and wrists may be used when measuring variations in body temperature.

Once acquisition of the core body temperature data is complete, the core thermometer 1 is removed from the body surface of the user (subject or patient). Then, the sticking member 60 is replaced. In other words, the used sticking member 60 is peeled off the lower outer body 20 and then a new sticking member 60 is stuck to the lower outer body 20. At this time, a protective film stuck to the first sticking layer 601 is peeled off, and then the sticking member 60 is stuck to the lower outer body 20. At this point (until the next usage), the release film is left attached.

As described in detail above, according to this embodiment, the first and second thermal resistors 301 and 302 consist of a plurality of (e.g., three) first and second thermal resistor layers 301a and 302a formed substantially parallel to the inner surface of the lower outer body 20. In other words, the first and second thermal resistors 301 and 302 have multilayer structures and therefore even if materials having comparatively high rigidities are used for the first and second thermal resistors 301 and 302 (i.e., first and second thermal resistor layers 301a and 302a), the first and second thermal resistors 301 and 302 are able to easily deform and are better able to closely contact and follow a body surface. On the other hand, even though the ability to closely contact and follow a surface is improved, stress acting on the first and second thermal resistors 301 and 302 (i.e., first and second thermal resistor layers 301a and 302a) can be alleviated, and therefore, for example, the wiring board 40 and so on attached to the first and second thermal resistors 301 and 302 can be prevented from being damaged. As a result, the ability to closely contact and follow a body surface can be improved and damage to the wiring board 40 and so forth inside the device can be prevented.

According to this embodiment, since the thicknesses of the plurality of (e.g., three) first thermal resistor layers 301*a* constituting the first thermal resistor 301 and the plurality of (e.g., three) second thermal resistor layers 302*a* constituting the second thermal resistor 302 are formed so as to be substantially identical, the first thermal resistor layers 301*a* of the first thermal resistor 301 and the second thermal resistor layers 302*a* of the second thermal resistor 302 can be stacked and formed into an integrated body, and therefore a multilayer thermal resistor in which there is little positional misalignment between the first thermal resistor 301 and the second thermal resistor 302 can be comparatively easily formed.

According to this embodiment, since the thickness of the first thermal resistor 301 and the thickness of the second thermal resistor 302 are formed so as to be substantially identical, a reduction in size can be realized by stacking the wiring board 40 on the first thermal resistor 301 and the second thermal resistor 302.

According to this embodiment, since a plurality of (e.g., three) first and second thermal resistor layers 301*a* and 302*a* are stuck together using the double-sided tapes 301*d* and 302*d*, the first thermal resistor 301 and the second thermal resistor 302 having no gaps can be comparatively easily formed.

According to this embodiment, since the Young's moduli of the double-sided tapes 301*d* and 302*d* are set to be smaller than the Young's modulus of at least one out of the first and second thermal resistor layers 301*a* and 302*a*, the rigidities of the first thermal resistor 301 and the second thermal resistor 302 (e.g., thermal resistor 30) can be reduced, the first thermal resistor 301 and second thermal resistor 302 (e.g., thermal resistor 30) are better able to closely contact and follow a body surface, and measurement accuracy can be improved.

According to this embodiment, since the thermal conductivity of the double-sided tapes 301*d* and 302*d* is set to be greater than or equal to the thermal conductivity of the material forming the first and second thermal resistor layers 301*a* and 302*a*, the thermal resistor 30 can be formed without greatly affecting the thermal resistance values of the first and second thermal resistors 301 and 302.

Furthermore, according to the first modification, the thermal resistance value can be adjusted and the ratio between the thermal resistances of the first thermal resistor 301B and the second thermal resistor 302 can be adjusted to a value suitable for taking measurements by including thermal resistor layers (i.e., first thermal resistor layer 301*b* in example in FIG. 6) having different thermal conductivities in the first thermal resistor 301 and/or second thermal resistor 302. Therefore, measurement accuracy can be improved.

An exemplary embodiment of the present invention has been described above, but it is noted that the present invention is not limited to the above-described embodiment and can be modified in various ways. For example, the shapes, sizes, and arrangements of the above-described thermal resistor 30 (i.e., first thermal resistor 301 and second thermal resistor 302), the wiring board 40, the flexible substrate 50, and the sticking member 60 (first sticking layer 601, second sticking layer 602, and breathable layer 603) and the arrangements of the first to fourth temperature sensors 701 to 704 and so on are not limited to those in the above-described embodiment and for example can be set as appropriate in accordance with requirements such as accuracy and cost.

In the above embodiment, a case in which the present invention is applied to a two thermal flux type core thermometer has been described as an example, but the present invention may be applied to a one thermal flux type core thermometer. In other words, a configuration may be adopted that does not include the second thermal resistor 302 and the third temperature sensor 703, the fourth temperature sensor 704, and so on. In addition, the present invention may also be applied to a thermometer other than a core thermometer.

Figure 13:
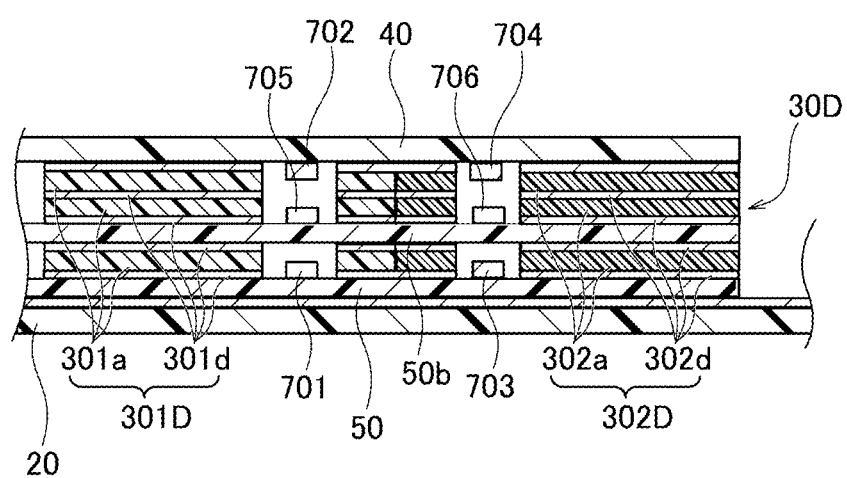
FIG. 13 is a sectional view illustrating thermal resistors of the core thermometer according to a modification of the exemplary embodiment in an enlarged manner.

Furthermore, in an alternative aspect of the present invention may be configured to further include a plurality of (for example, two) temperature sensors 705 and 706 between the layers of the first and second thermal resistor layers 301*a* and 302*a* forming the first and second thermal resistors 301 and 302. In other words, as illustrated in FIG. 13, the present invention may have a configuration in which a flexible substrate 50*b* on which fifth and sixth temperature sensors 705 and 706 are mounted is interposed between the layers of the first and second thermal resistors 301 and 302 (i.e., first and second thermal resistor layers 301*a* and 302*a*). In this case, it is preferable to use a flexible substrate (FPC) instead of a rigid substrate as the flexible substrate 50*b*, since there will be little effect on the thermal resistance values of first and second thermal resistors 301D and 302D and the rigidity is preferably small. With this configuration, the temperatures inside the first and second thermal resistors 301D and 302D can be measured and therefore the accuracy with which the core body temperature is estimated can be further improved.

REFERENCE SIGNS LIST 1 core thermometer (stick-on thermometer)
10 upper outer body
15 body-temperature-measuring unit
20 lower outer body
30, 30B, 30C, 30D thermal resistor
301, 301B, 301C, 301D first thermal resistor
301*a*, 301*b*, 301*c* first thermal resistor layer
301*d* first double-sided tape
301*e* slit
302, 302C, 302D second thermal resistor
302*a*, 302*c* second thermal resistor layer
302*d* second double-sided tape
302*e* slit
301*f*, 302*f* through hole
40 wiring board
401, 402 thermal equalization pattern
403 wireless communication unit
404 coin cell
405 LED
406 power supply switch
407 FPC connector
50, 50*b* flexible substrate
501, 502 thermal equalization pattern
60 sticking member
60*a*, 60*b* through hole
60*c* through hole
60*d* cut out part
601 first sticking layer
602 second sticking layer
603 breathable layer
70 (701 to 706) temperature sensors (first to sixth temperature sensors)

The invention claimed is:

1. A thermometer for attaching to a body surface to measure a body temperature, the thermometer comprising:
a thermal resistor having a prescribed thermal resistance value and disposed substantially parallel to an inner surface of a lower outer body of the thermometer in a cross-sectional view;
a plurality of temperature sensors disposed along a thickness direction of the thermal resistor; and
a wiring board disposed substantially parallel to the thermal resistor and on which a processing circuit is mounted that is configured to process detection signals from the plurality of temperature sensors,
wherein the thermal resistor comprises a plurality of thermal resistor layers disposed substantially parallel to the inner surface of the lower outer body of the thermometer, and
wherein the plurality of temperature sensors are adjacent to the plurality of thermal resistor layers in a direction parallel to the inner surface of the lower outer body and do not overlap the plurality of thermal resistor layers in the thickness direction that is perpendicular to the direction parallel to the inner surface.

2. The thermometer according to claim 1, wherein the plurality of thermal resistor layers are stuck to each other using double-sided tape.

3. The thermometer according to claim 2, wherein the double-sided tape comprises a Young's modulus that is smaller than a Young's modulus of the thermal resistor layers.

4. The thermometer according to claim 2, wherein the double-sided tape comprises thickness is smaller than a thickness of the thermal resistor layers, respectively.

5. The thermometer according to claim 2, wherein the double-sided tape is constructed to enable relative misalignment between the plurality of thermal resistor layers.

6. The thermometer according to claim 2, wherein the double-sided tape comprises a thermal conductivity that is greater than or equal to a thermal conductivity of a material forming the thermal resistor layers.

7. The thermometer according to claim 2, wherein the plurality of thermal resistor layers comprise different thermal conductivities of each other.

8. The thermometer according to claim 2, further comprising an additional temperature sensor disposed between the plurality of temperature sensors.

9. The thermometer according to claim 2, further comprising:
a second thermal resistor that has a different thermal resistance value from the thermal resistor and that is disposed parallel to the thermal resistor; and
a plurality of temperature sensors that are disposed along a thickness direction of the second thermal resistor.

10. The thermometer according to claim 9, wherein the thermal resistor has a thickness that is substantially identical to a thickness of the second thermal resistor.

11. The thermometer according to claim 10, wherein the second thermal resistor comprises a plurality of thermal resistor layers disposed substantially parallel to the inner surface of the lower outer body.

12. The thermometer according to claim 11, wherein each of the plurality of thermal resistor layers forming the thermal resistor comprise a respective thickness that is substantially identical to a respective thickness of each of the plurality of thermal resistor layers forming the second thermal resistor.

13. A thermometer for attaching to a body surface to measure a body temperature, the thermometer comprising:
a thermal resistor having a prescribed thermal resistance value and disposed substantially parallel to an inner surface of a lower outer body of the thermometer in a cross-sectional view;
a plurality of temperature sensors disposed along a thickness direction of the thermal resistor; and
a wiring board disposed substantially parallel to the thermal resistor and on which a processing circuit is mounted that is configured to process detection signals from the plurality of temperature sensors,
wherein a slit is disposed in an outer peripheral portion of the thermal resistor except for around the temperature sensors when viewed in the thickness direction of the thermal resistor.

14. The thermometer according to claim 13, wherein the slit is disposed substantially parallel to the inner surface of the lower outer body.

15. The thermometer according to claim 13, wherein the slit is disposed perpendicular to the inner surface of the lower outer body.

16. A thermometer for measuring a body temperature of a body surface, the thermometer comprising:
an upper outer body and a lower outer body with a space defined therebetween;
a thermal resistor disposed between the upper outer body and the lower outer body and disposed in parallel to an inner surface of the lower outer body in a cross-sectional view;
a plurality of temperature sensors disposed in a thickness direction of the thermal resistor; and
a wiring board extending parallel to the thermal resistor and having a processing circuit mounted thereon that is configured to process detection signals from the plurality of temperature sensors,
wherein the thermal resistor comprises a plurality of thermal resistor layers extending parallel to the inner surface of the lower outer body, and
wherein the plurality of temperature sensors are adjacent to the plurality of thermal resistor layers in a direction parallel to the inner surface of the lower outer body and do not overlap the plurality of thermal resistor layers in the thickness direction of the thermal resistor that is perpendicular to the direction parallel to the inner surface.

17. The thermometer according to claim 16, wherein the plurality of thermal resistor layers are stuck to each other using double-sided tape.

18. The thermometer according to claim 16, further comprising an additional temperature sensor disposed between the plurality of temperature sensors.

19. The thermometer according to claim 16, further comprising:
a second thermal resistor that has a different thermal resistance value from the thermal resistor and that is disposed parallel to the thermal resistor; and
a plurality of temperature sensors that are disposed along a thickness direction of the second thermal resistor.

20. The thermometer according to claim 19, wherein the thermal resistor has a thickness that is substantially identical to a thickness of the second thermal resistor.

* * * * *